United States Patent Office 2,921,063
Patented Jan. 12, 1960

2,921,063

STREPTOMYCIN PURIFICATION

Leon J. Heuser, Princeton, N.J., assignor to Olin Mathieson Chemical Corporation, New York, N.Y., a corporation of Virginia No Drawing. Application January 16, 1958
Serial No. 709,186

3 Claims. (Cl. 260—210)

This invention relates to, and has for its object the provision of, an improved process for the purification of antibiotics of the streptomycin type (i.e. members of the genus composed of streptomycin and antibiotically-active compounds which, like streptomycin, possess a functional carbonyl group).

The presently employed processes of recovering streptomycin type antibiotics from the aqueous culture media in which the antibiotic is produced, or from aqueous solutions in which the antibiotic or its salts are otherwise present in impure state, require numerous steps to obtain the antibiotic in sufficient purity to be safe for administration to humans. The commonly employed purification and recovery processes require the adsorption of the antibiotic on an ion-exchange resin and a plurality of extractive or precipitative steps for removing the antibiotic from the adsorbent and for purifying it.

Because of the ready solubility of streptomycin type antibiotics and their common salts in water, and their very slight solubility in most organic solvents, it has been difficult, if not impossible, to purify streptomycin type antibiotics by solvent extraction processes, and to free them from the chemically-related impurities which inevitably are produced by the fermentation along with the desired antibiotic (so-called "genetic contaminants"), and from the water-soluble inorganic salt impurities which are present as constituents of the culture medium or are introduced by preliminary processing steps.

It has now been found that selective purification of streptomycin type antibiotics can be accomplished by a method which essentially comprises reacting the antibiotic (either in free or salt form) in solution, with a compound selected from the group consisting of hydroxylamine, methoxyamine and salts thereof, so as to form a crystalline derivative of streptomycin which can easily be separated from the impure solution and from which the antibiotic (or salt thereof), of increased purity, can be regenerated.

It, therefore, is an object of the present invention to provide a simple, efficient process of obtaining streptomycin type antibiotics (or their salts) in a purified state.

These objectives have been achieved by a method essentially comprising starting with (or preparing) a solution of the impure antibiotic (either in free or salt form), interacting therewith a compound selected from the group consisting of hydroxylamine, methoxyamine and salts thereof, recovering the resulting crystalline derivative, interacting this derivative with a transoximation reagent, and recovering an antibiotic (or salt thereof) of increased purity.

With streptomycin as an example, the process comprises introducing into an impure solution of streptomycin (or salt thereof) hydroxylamine sulfate, removing the crystalline streptomycin oxime sulfate by filtration, adding formaldehyde (a transoximation reagent) and recovering the streptomycin sulfate of increased purity.

Other transoximation reagents utilizable for converting the crystalline derivative (e.g. streptomycin oxime or salt thereof) to the antibiotic include, inter alia, acetaldehyde, butyraldehyde, benzaldehyde, furfural, sulfurous acid, diacetyl pyruvic acid, α-ketoglutaric acid, quinone, phthaldehydic acid, cinnamaldehyde, p-nitrobenzaldehyde, 3-methylglutaraldehyde, α-hydroxyadipaldehyde, diacetyl monoxime, amyl nitrite and nitrous acid.

The following examples are illustrative, but by no means limitative, of the invention:

Example I (a) 400 ml. of carboxylic-acid-type ion-exchange resin (e.g. IRC–50) fully loaded with streptomycin is washed with 600 ml. water and, after slurrying in 400 ml. fresh water, is eluted at pH 2.0 with 40% sulfuric acid (other water-soluble acids utilizable for eluting the streptomycin include, inter alia, hydrochloric, phosphoric and nitric).

After filtration, the eluate is neutralized to pH 6.5 with an anion exchange resin (e.g. IR–45) and refiltered. 450 ml. neutralized eluate is then concentrated to 250 ml. and diluted with 125 ml. methyl alcohol. After standing for two hours in the cold room (5° C.), the small amount of inorganic precipitate (about 700 mg.) is filtered off and 12.6 g. $NH_2OH \cdot \frac{1}{2}H_2SO_4$ is added with agitation. The excess acid formed is neutralized with triethylamine to pH 5.8 and agitated one hour. After standing overnight, the crystals of streptomycin oxime sulfate which form are filtered off and dried.

(b) 20 gm. of streptomycin oxime sulfate crystals are dissolved in 200 ml. distilled water at 45–50° C. The solution is cooled to 30° C. and adjusted to pH 2.0 with 10% sulfuric acid. It is then placed under vacuum distillation at 28–32 mm. Hg at a pot temperature of 28–30° C. and 20 ml. formalin diluted to 400 ml. with distilled water, is added over an eight hour period at 50 ml. per hour. After distillation, the concentrate (about 65 ml.) is precipitated from five volumes of methanol, redissolved in 100 ml. distilled water, and adjusted to pH 5.0 with an anion exchange resin (e.g. IR–45). The solution is then treated with 3 gm. of activated carbon (Darco G–60), reconcentrated to 50 ml., and lyophilized, yielding about 17.2 gm. of purified streptomycin sulfate.

(b') *Alternative reconversion method*

20 gm. of streptomycin oxime sulfate crystals are dissolved in 200 ml. of distilled water at 40°–45° C. The solution is cooled to 25° C. and adjusted to pH 2.2 with 40% $H_2SO_4$. 60 ml. of freshly distilled furfural is added and the mixture agitated at room temperature for twenty hours. The aqueous layer is separated and added to 1 liter of methanol with agitation. The precipitated streptomycin sulfate is dissolved in 75 ml. water, the solution neutralized with an anion exchange resin (e.g. IR–45 resin), and treated with 3 gm. of activated carbon (e.g. Darco G–60). Freeze drying the filtrate yields about 16 gm. of purified streptomycin sulfate.

EXAMPLE II (a) 90 g. streptomycin sulfate is dissolved in 90 ml. water and added to a solution of 12 gm. methoxyamine hydrochloride in 25 ml. of water (the pH of the solution being adjusted to 4.5 with triethylamine). Addition of 225 ml. methanol leads to the gradual crystallization of 78 g. of the methoxyamine derivative.

(b) Treatment of the separated methoxyamine derivative with formaldehyde yields a streptomycin salt of a substantially increased purity.

The invention may be variously otherwise embodied within the scope of the appended claims.

What is claimed is:

1. A method of purifying an antibiotic selected from the group consisting of streptomycin and its salts which comprises interacting a solution of said antibiotic and soluble impurities; with a compound selected from the group consisting of hydroxylamine, methoxyamine and salts thereof, recovering the resulting crystalline antibiotic derivative, adding a transoximation reagent thereto, and recovering the antibiotic of increased purity.

2. A method of purifying streptomycin which comprises interacting a solution of streptomycin and soluble impurities with hydroxylamine sulfate, recovering the resulting crystalline streptomycin oxime sulfate, adding a transoximation reagent thereto, and recovering streptomycin of increased purity.

3. A method of purifying streptomycin which comprises interacting a solution of streptomycin and soluble impurities with hydroxylamine sulfate, recovering the resulting crystalline streptomycin oxime sulfate, adding formalin thereto, and recovering streptomycin of increased purity.

References Cited in the file of this patent

UNITED STATES PATENTS 2,532,393    Brink _____ Dec. 5, 1950